(No Model.)

J. E. MILES.
DEVICE FOR JOINTING THE TEETH OF BAND SAWS.

No. 410,647. Patented Sept. 10, 1889.

Witnesses
Inventor
James E. Miles

UNITED STATES PATENT OFFICE.

JAMES E. MILES, OF EAST SAGINAW, MICHIGAN.

DEVICE FOR JOINTING THE TEETH OF BAND-SAWS.

SPECIFICATION forming part of Letters Patent No. 410,647, dated September 10, 1889.

Application filed April 19, 1888. Serial No. 271,473. (No model.)

*To all whom it may concern:*

Be it known that I, JAMES E. MILES, of the city of East Saginaw, in the county of Saginaw and State of Michigan, have invented a new and useful Device for Jointing the Teeth of Band-Saws; and I do hereby declare that the following is a full, clear, and exact description of the construction and operation of the same, reference being had to the annexed drawings, making a part of this specification, in which—

Figure 1:
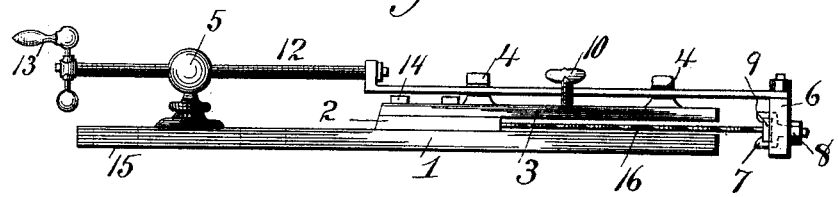
Figure 2:
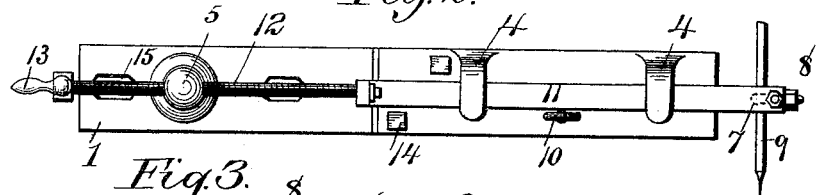
Figure 3:
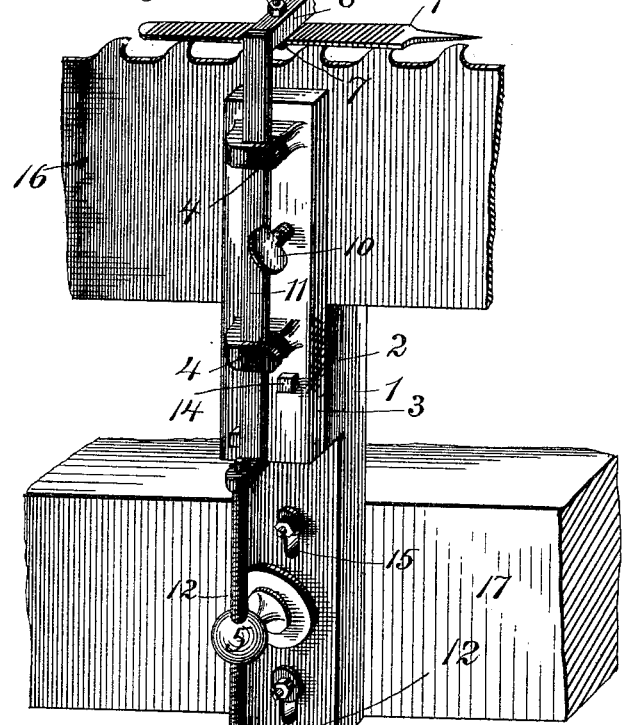

Figure 1 is a side view; Fig. 2, a front view; Fig. 3, a perspective view.

1 and 3 are suitable metallic plates separated by the steel plate 2, fastened together by the bolts 14 14, and forming the space 18 to receive the saw 16.

11 is a bar arranged to slide in grooves in the lugs 4 4, and kept in place by the retaining-pin 10.

12 is an adjusting-screw passing through the pivoted post 5 and operated by the handle 13.

9 is a file held in position by the clamp 7 and nut 8. The part 6 secures clamp to sliding bar 11.

15 15 are slots by which the device may be secured to the saw-filing bench.

16 is a section of saw in position to be operated upon.

The operation of the jointer is as follows: The saw being placed in position on the saw-filing bench, it is caused to pass through said device, and the file coming in contact with the teeth of said saw the points of said teeth are brought to a uniform distance from the back of said saw.

The object of my invention is to provide a device to be adjustably secured to a saw-filing bench and to hold a file in an adjustable manner parallel with line of saw-teeth.

Having thus described my invention, what I claim, and desire to secure by Letters Patent, is—

The combination of the plates 1 2 3, bolted together to form the space 18, the sliding bar 11, the adjusting-screw 12, the pivoted post 5, and the handle 13, as and for the purpose herein set forth.

JAMES E. MILES.

Witnesses:
RANDALL A. PALMER,
THOMAS JOHNSON.